United States Patent
Millin et al.

(10) Patent No.: US 9,824,290 B2
(45) Date of Patent: Nov. 21, 2017

(54) CORRIDOR CAPTURE

(71) Applicant: nearmap Australia Pty Ltd., Sydney (AU)

(72) Inventors: Andrew Millin, Scarborough (AU); Russell Alan Rogers, Bull Creek (AU); Paul Lapstun, Rodd Point (AU)

(73) Assignee: nearmap Australia Pty Ltd., Sydney (AU)

( * ) Notice: Subject to any disclaimer, the term of this patent is extended or adjusted under 35 U.S.C. 154(b) by 107 days.

(21) Appl. No.: 14/618,551

(22) Filed: Feb. 10, 2015

(65) Prior Publication Data
US 2016/0229555 A1 Aug. 11, 2016

(51) Int. Cl.
| | | |
|---|---|---|
| *G06K 9/00* | (2006.01) | |
| *G06K 9/46* | (2006.01) | |
| *G06T 3/40* | (2006.01) | |
| *G06T 7/73* | (2017.01) | |
| *H04N 7/18* | (2006.01) | |

(52) U.S. Cl.
CPC ......... *G06K 9/4604* (2013.01); *G06K 9/0063* (2013.01); *G06K 9/00208* (2013.01); *G06T 3/4038* (2013.01); *G06T 7/73* (2017.01); *G06T 2207/10032* (2013.01); *G06T 2207/30184* (2013.01); *G06T 2207/30244* (2013.01); *H04N 7/183* (2013.01)

(58) Field of Classification Search
CPC ................................ G06K 9/4604; G06T 7/73
USPC ........................................................ 348/144
See application file for complete search history.

(56) References Cited

U.S. PATENT DOCUMENTS

| | | | |
|---|---|---|---|
| 8,497,905 B2 | 7/2013 | Nixon | |
| 8,675,068 B2 | 3/2014 | Nixon | |
| 2009/0256909 A1* | 10/2009 | Nixon | B64D 47/08 348/144 |
| 2012/0050525 A1 | 3/2012 | Rinner et al. | |
| 2012/0154584 A1 | 6/2012 | Omer et al. | |
| 2013/0235199 A1 | 9/2013 | Nixon | |
| 2014/0146173 A1 | 5/2014 | Joyce et al. | |

(Continued)

OTHER PUBLICATIONS

U.S. Appl. No. 13/873,818, filed Apr. 30, 2013, Nixon.

(Continued)

*Primary Examiner* — Jeffery Williams
(74) *Attorney, Agent, or Firm* — Oblon, McClelland, Maier & Neustadt, L.L.P.

(57) ABSTRACT

A method of creating a orthomosaic of a corridor area, the corridor area at least partially described by a corridor path, the method comprising flying an aircraft along a primary flight line approximating the corridor path and capturing a sequence of primary images; flying the aircraft along a secondary flight line substantially parallel to the corridor path and capturing a sequence of secondary images; identifying, in the primary images and secondary images, common features corresponding to common ground points; estimating, via bundle adjustment and from the common ground points, an exterior orientation associated with each primary image and a three-dimensional position associated with each ground point; orthorectifying, using at least some of the exterior orientations and at least some of the three-dimensional ground point positions, at least some of the primary images; and merging the orthorectified primary images to create the orthomosaic.

10 Claims, 17 Drawing Sheets

(56) References Cited

U.S. PATENT DOCUMENTS

2014/0172200 A1\* 6/2014 Miralles .................. G05D 1/12
                                                         701/3
2015/0022656 A1  1/2015 Carr et al.
2016/0212345 A1\* 7/2016 van Cruyningen  H04N 5/23267

OTHER PUBLICATIONS

U.S. Appl. No. 14/310,523, filed Jun. 20, 2014, Tarlinton et al.
U.S. Appl. No. 14/478,380, filed Sep. 5, 2014, Tarlinton et al.
U.S. Appl. No. 14/687,544, filed Apr. 15, 2015, Lapstun et al.
International Search Report dated Apr. 4, 2016 in International Patent Application No. PCT/AU2016/050018.
Written Opinion of the International Searching Authority dated Apr. 4, 2016 in International Patent Application No. PCT/AU2016/050018.

\* cited by examiner

EQ 1: $w = 2a \cdot \tan(\beta/2)$

EQ 2: $\tan(\theta) = v^2/rg$
EQ 3: $d/a = \tan(\theta)$
EQ 4: $d = av^2/rg$

CORRIDOR CAPTURE

FIELD OF THE INVENTION

The present invention relates to the efficient and accurate creation of corridor orthomosaics.

BACKGROUND OF THE INVENTION

Accurately georeferenced mosaics of orthophotos, referred to as orthomosaics, are becoming popular alternatives to traditional pictorial maps because they can be created automatically from aerial photos, and because they show actual useful detail on the ground.

The creation of accurate orthomosaics from aerial photos is well described in the literature. See, for example, Elements of Photogrammetry with Application in GIS, Fourth Edition (Wolf et al.), and the Manual of Photogrammetry, Sixth Edition (American Society for Photogrammetry and Remote Sensing (ASPRS)).

The creation of an orthomosaic requires the systematic capture of overlapping aerial photos of the area of interest, both to ensure complete coverage of the area of interest, and to ensure that there is sufficient redundancy in the imagery to allow accurate bundle adjustment, orthorectification and alignment of the photos.

Bundle adjustment is the process by which redundant estimates of ground points and camera poses are refined. Modern bundle adjustment is described in detail in "Bundle Adjustment—A Modern Synthesis" (Triggs et al.).

Bundle adjustment may operate on the positions of manually-identified ground points, or, increasingly, on the positions of automatically-identified ground features which are automatically matched between overlapping photos.

Overlapping aerial photos are typically captured by navigating a survey aircraft in a serpentine pattern over the area of interest. The survey aircraft carries an aerial camera system, and the serpentine flight pattern ensures that the photos captured by the camera system overlap both along flight lines within the flight pattern and between adjacent flight lines.

Corridors containing railway lines, highways, power lines, rivers, canals, coastlines and other narrow meandering features are often of particular interest. However, traditional area-based aerial surveying techniques are sub-optimal for capturing corridors.

SUMMARY OF THE INVENTION

In a first aspect, the present invention provides a method of creating a orthomosaic of a corridor area, the corridor area at least partially described by a corridor path, the method comprising: flying an aircraft along a primary flight line, the primary flight line comprising a sequence of primary flight line segments, each primary flight line segment approximating at least part of the corridor path; capturing, during flight along each primary flight line segment and via an aerial camera system carried by the aircraft, a sequence of primary images, each primary image at least partially overlapping its successor in the sequence; flying the aircraft along a secondary flight line, the secondary flight line comprising a sequence of secondary flight line segments, each secondary flight line segment substantially parallel to at least part of the corridor path; capturing, during flight along each secondary flight line segment and via the aerial camera system carried by the aircraft, a sequence of secondary images, at least some of the secondary images overlapping at least some of the primary images; identifying, in a plurality of the primary images and secondary images, common features corresponding to common ground points; estimating, via bundle adjustment and from the common ground points, an exterior orientation associated with each primary image and a three-dimensional position associated with each ground point; orthorectifying, using at least some of the exterior orientations and at least some of the three-dimensional ground point positions, at least some of the primary images; and merging the orthorectified primary images to create the orthomosaic.

The aircraft may be flown substantially level along each primary flight line segment, and may be flown along a go-around turn between each primary flight line segment and its successor, the turn having an angle greater than 180 degrees.

The aircraft may be flown along a turn between each secondary flight line segment and its successor, the turn having an angle less than 90 degrees.

The aerial camera system may comprise at least one vertical camera for capturing substantially vertical images.

The aerial camera system may comprise at least one oblique camera for capturing substantially oblique images.

The primary images and secondary images may comprise both vertical images and oblique images.

The primary images may comprise vertical images and the secondary images may comprise oblique images.

The aerial camera system may comprise at least one overview camera for capturing overview images, and a plurality of detail cameras for capturing detail images, each detail image having a higher resolution than the at least one overview image, at least some of the detail images may overlap some of the overview images, and the primary images may comprise both overview images and detail images.

The secondary images may comprise both overview images and detail images.

The secondary flight line may be curved and include banked turns.

DRAWINGS—FIGURES

REFERENCE NUMERALS

100 Corridor path.
102 Polyline approximating corridor path.
104 Polyline vertex.
106 Polygon approximating corridor shape.
108 Intersecting area of interest.
110 Area-based area of interest.
112 Flight line.
114 Turn-around between successive flight lines.
120 Survey path segment.
122 Survey path segment swath.
124 Wider survey path segment swath for intersecting area of interest.
126 Go-around between successive flight line segments.
128 Flight line segment.
130 Primary flight line segment.
132 Secondary flight line segment.
134 Gentle turn between successive flight line segments.
136 Aggregate swath.
140 Vertical imaging field of view.
142 Oblique imaging field of view.
150 Ground.
152 Corridor centreline on ground.
154 Curved flight path.
156 Bank angle.
158 Bank offset.
160 Detail field of view.
164 Longitudinal detail field of view.
170 Overview field of view.
172 Lateral overview field of view.
174 Longitudinal overview field of view.
180 Aggregate detail field of view.
182 Lateral aggregate detail field of view.
212 Camera hole in floor of aircraft.
220 Direction of flight.
230 Aerial survey aircraft.
300 Computer.
302 Pilot display.
304 Inertial Measurement Unit (IMU).
306 Global Navigation Satellite System (GNSS) receiver.
308 Analog-to-digital converters (ADCs).
310 Camera control unit (CCU).
320 Battery unit.
322 Aircraft auxiliary power.
324 Ground power unit (GPU).
326 DC-DC converter(s).
330 Angular motion compensation (AMC) unit(s).
340 Camera(s).
350 Aerial camera system.
352 Dual-resolution aerial camera system.
400 Detail photos.
402 Overview photos.
404 Orthomosaic.
410 Match features step.
412 Solve for pose & positions step.
414 Orthorectify photos step.
416 Blend orthophotos step.

DETAILED DESCRIPTION OF PREFERRED EMBODIMENTS

Figure 1:
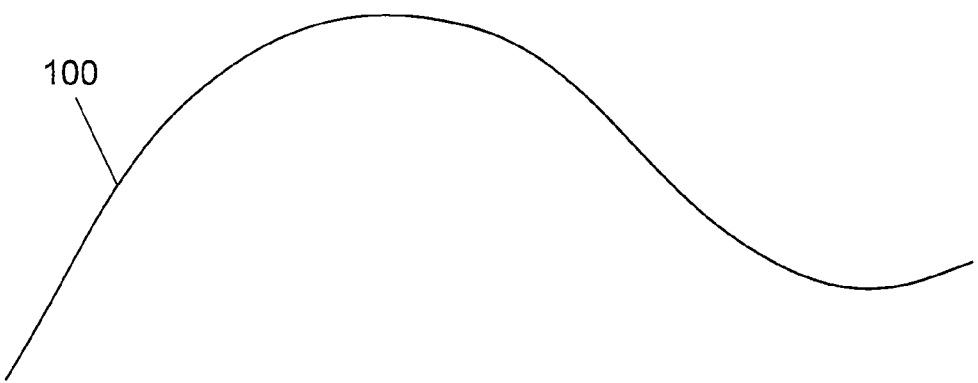
FIG. 1 shows a corridor path of interest.

A corridor area of interest (simply "corridor" hereafter) typically consists of a strip of land along an arbitrary path 100, as shown in FIG. 1. The corridor may follow a physical structure, such as a railway line or river. The length of the corridor is typically much longer than the width of the corridor.

The width of the corridor may, in general, vary along the path, but for many corridors a fixed width applies. For illustrative purposes in this specification only fixed-width corridors are generally shown.

The corridor may be continuous or discontinuous, and the corridor may comprise multiple smaller paths such as loops or forks. For illustrative purposes in this specification only continuous unforked corridors are shown.

Figure 2:
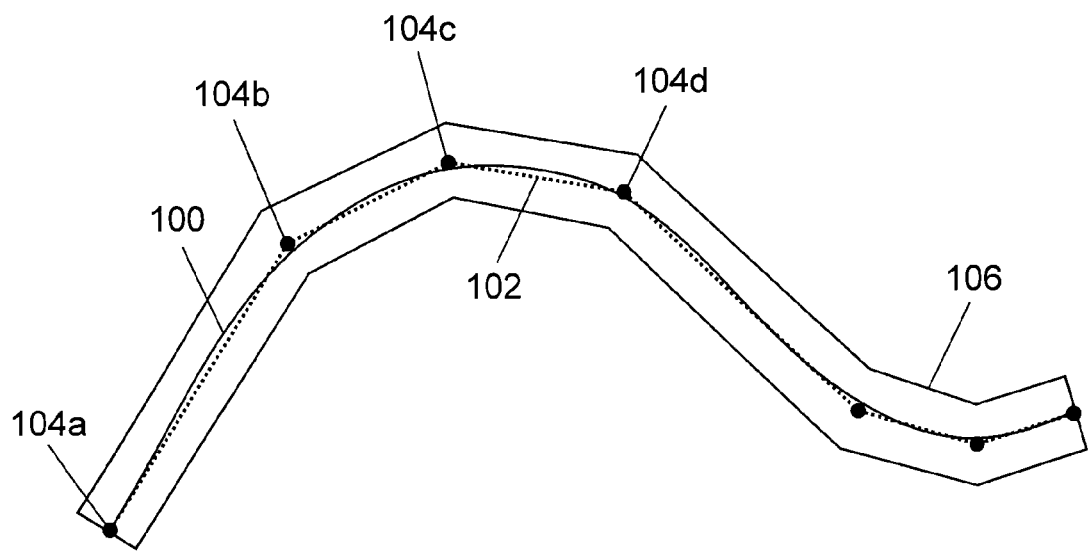
FIG. 2 shows the corridor path approximated by a polyline, and the corridor area approximated by a polygon.

As shown in FIG. 2, the corridor path may be approximated by a polyline 102, consisting of a sequence of straight-line segments between successive vertices 104. The polyline is constructed so that the maximum perpendicular distance from the path to the polyline is within a defined tolerance. For a desired corridor width the polyline vertices 104 can be offset perpendicular to the path to obtain the vertices of a polygon 106 that encloses the corridor. By adjusting the tolerance, and hence the number of vertices, the polyline and polygon can approximate the corridor path and corridor area with arbitrary precision. The desired corridor width is typically expanded to accommodate the polyline tolerance, i.e. to ensure that the polygon 106 encloses the desired corridor area.

Rather than being defined explicitly via a path, a corridor may also be defined directly via one or more shapes (e.g. polygons).

Figure 3:
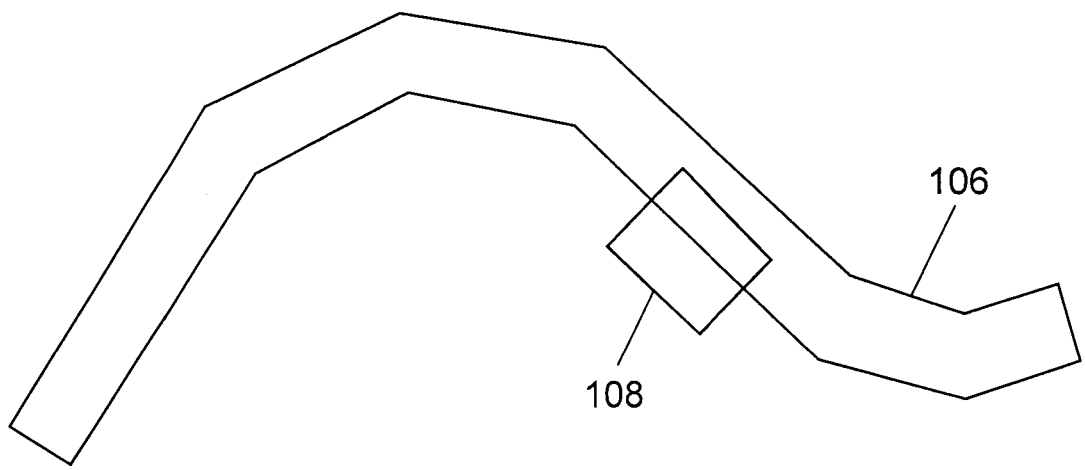
FIG. 3 shows the corridor combined with an intersecting area of interest.

The corridor may intersect with an area of interest 108 that is not fully enclosed by the corridor boundary, such as a town adjacent to a highway. The corridor survey area may then be defined by the union of the corridor boundary and the boundary of the area of interest, as shown in FIG. 3.

Figure 4:
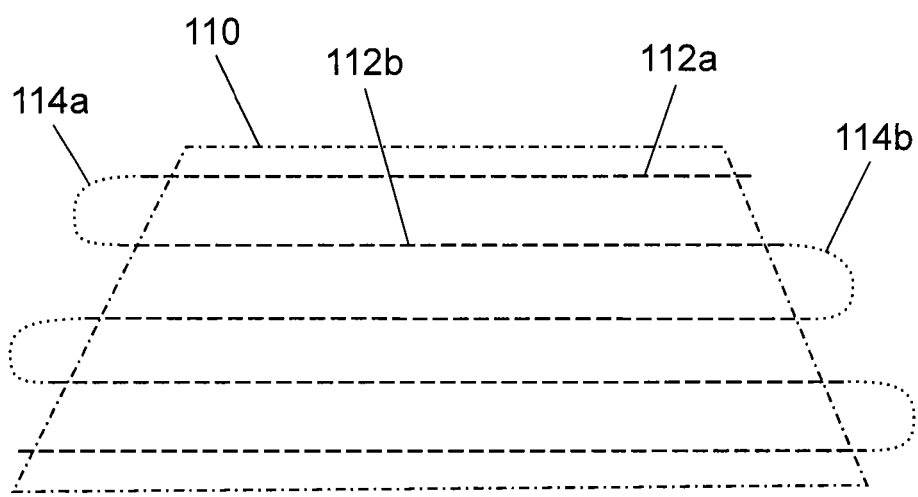
FIG. 4 shows the serpentine flight pattern of an area-based aerial survey.

When capturing a traditional extended survey area 110, as shown in FIG. 4, the survey aircraft typically follows a serpentine flight pattern. The flight plan consists of a number of parallel flight lines 112, separated by a lateral offset. Each flight line specifies a start and end location and altitude. The aircraft travels in a straight line from the start point to the end point. At the end of a flight line the aircraft performs a 180-degree turn 114 to return along a laterally spaced parallel path specified by the next flight line's start and end locations.

The location and number of flight lines are calculated from a number of parameters, including the survey boundary, flight altitude, ground elevation, camera system field of view, and the desired forward overlap and side overlap.

Traditional aerial survey flight planning is well described in the literature. See for example U.S. Pat. No. 6,711,475 (Murphy), the contents of which are incorporated herein by reference.

A further factor in calculating the location and number of flight lines is a contingency distance at the survey boundary. The contingency distance is added to the survey boundary to enlarge the area of capture. This allows for non-uniform imagery capture due to turbulence or changes in aircraft pitch, yaw or roll near the survey edge and ensures complete coverage within the survey area.

Figure 5:
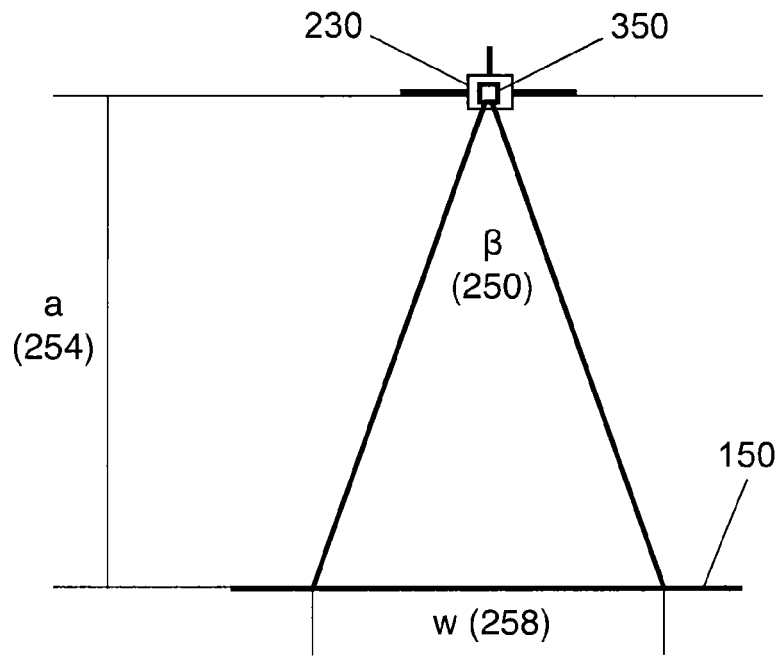
FIG. 5 shows a diagram and equation relating the swath width of an aerial camera system to its angular field of view and altitude above ground level.

FIG. 5 shows a survey aircraft 230 carrying an aerial camera system 350. The diagram and equation relate the swath width (w) 258 of the aerial camera system 350, i.e. where its field of view intersects the ground 150, to its angular field of view (beta) 250 and altitude above ground level (a) 254.

For corridor capture, flight plan generation combines the flight line calculation method for traditional survey capture with an additional process that fits multiple survey path segments to the corridor survey area using a cost minimisation process.

Firstly, traditional survey flight planning calculations are used to determine the minimum number of parallel flight lines required to capture the width of the corridor survey. The flight planning calculations include a contingency distance added to the corridor width to ensure complete imagery coverage. For high altitude surveys or narrow corridor paths, it may be possible to capture the full corridor width with a single flight line, i.e. if the corridor width is contained within the swath width 258 of the camera system. For lower altitude surveys or wider corridors, multiple flight lines may be required to capture the full corridor width.

The flight planning process calculates an aggregate swath width for a set of adjacent flight lines, based on the swath width 258 of the camera system and the required lateral overlap. The contingency added to the corridor survey width is subtracted from the aggregate swath width to determine the usable swath width for corridor flight planning.

Secondly, the corridor survey area is subdivided into multiple linear survey path segments. The width of each path segment is determined by the aggregate swath width. The length and orientation of each path segment is determined by the direction and variation in the corridor path. For corridor paths with extended straight sections, e.g. railway lines, the survey may be able to be subdivided into a small number of long path segments. For meandering corridor survey paths, e.g. rivers, the survey may require subdivision into a larger number of short path segments. The path segments may be oriented in any direction, and may intersect at arbitrary angles.

It is desirable to minimise the number of path segments flown by the aircraft, as the survey aircraft may need to perform a go-around turn to travel from the end of one path segment to the beginning of the next path segment.

Figure 6:
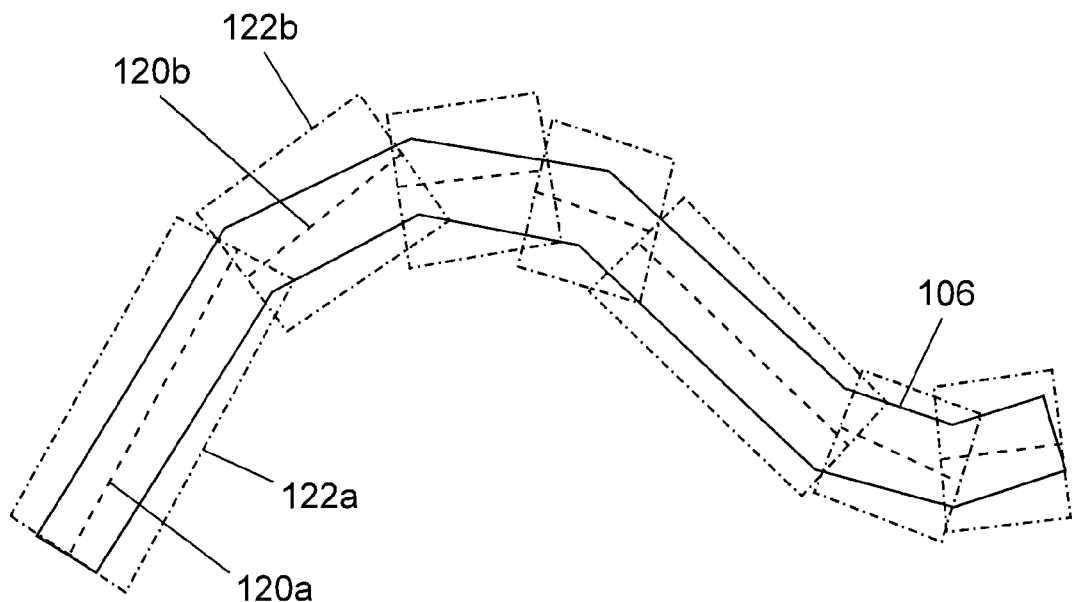
FIG. 6 shows a method for covering the corridor area of interest with a sequence of survey path segments.

Many methods exists for subdividing the survey into path segments. A simple method, illustrated in FIG. 6, starts at one end of the corridor and creates a path segment 120 in the direction of the corridor path. The path segment is terminated when the survey boundary is no longer contained within the usable swath 122. At this point, a new path segment 120 is started at this point in the direction of the corridor path and the process is repeated until the end of the corridor is reached.

Figure 7:
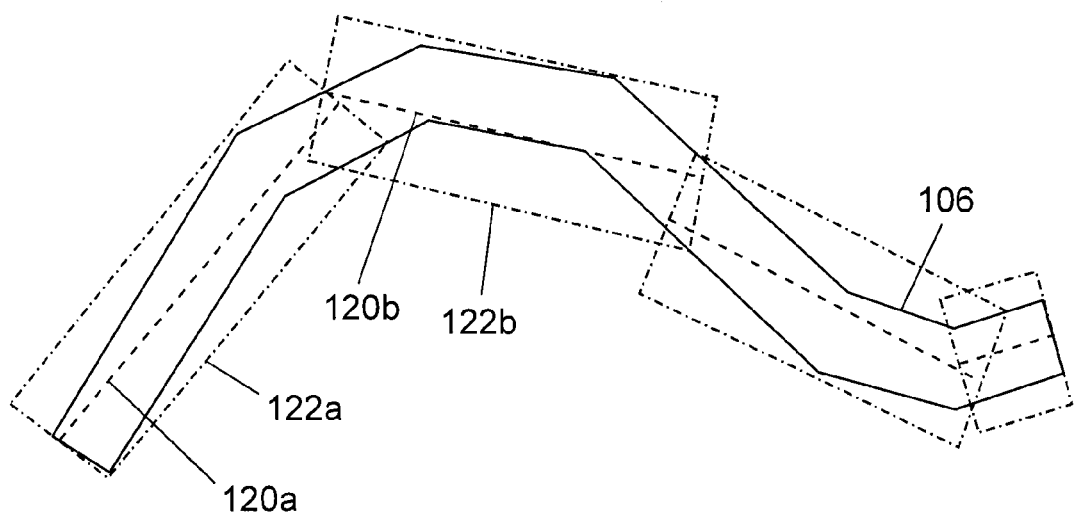
FIG. 7 shows another method for covering the corridor area of interest with a sequence of survey path segments.

Another method, illustrated in FIG. 7, uses cost minimisation to reduce the number of path segments 120. By starting path segments 120 at a point perpendicularly offset from the corridor path 100 and varying the path segment orientation, it is typically possible to achieve a longer path segment compared to the simple method described above. This minimisation process finds the optimal path start position and orientation for each path segment.

Another method uses cost minimisation to maximise the length of path segments 120. This method finds the longest possible path segment for the corridor path. The method then finds the next longest path segment. The process continues until the entire corridor is contained within the path segments.

Another method derives the path segments 120 directly from the straight-line segments of the corridor polyline 102.

To ensure complete coverage of the corridor survey area 106, it is necessary to adjust the start and end point of each path segment due to the intersection of path segments at arbitrary angles and the contingency applied to survey boundaries. The length of each path segment is increased by a contingency value to increase overlap between adjacent path segments and to ensure areas near the corridor survey edges are fully captured by imagery at path segment intersections.

The number of flight lines per path segment is not restricted to the minimum number of flight lines calculated by the flight planning calculations. Increasing the number of flight lines increases the usable swath width, which generally decreases the number of path segments required to capture the survey imagery.

Increasing the number of flight lines is also of benefit where the path segmentation creates a large number of short path segments, e.g. when capturing a meandering river.

Increasing the number of flight lines is also of benefit when the width of the corridor survey path is not constant, allowing thin corridor segments to be captured with fewer flight lines, and wider corridor segments to be captured with a larger number of flight lines.

Figure 8:
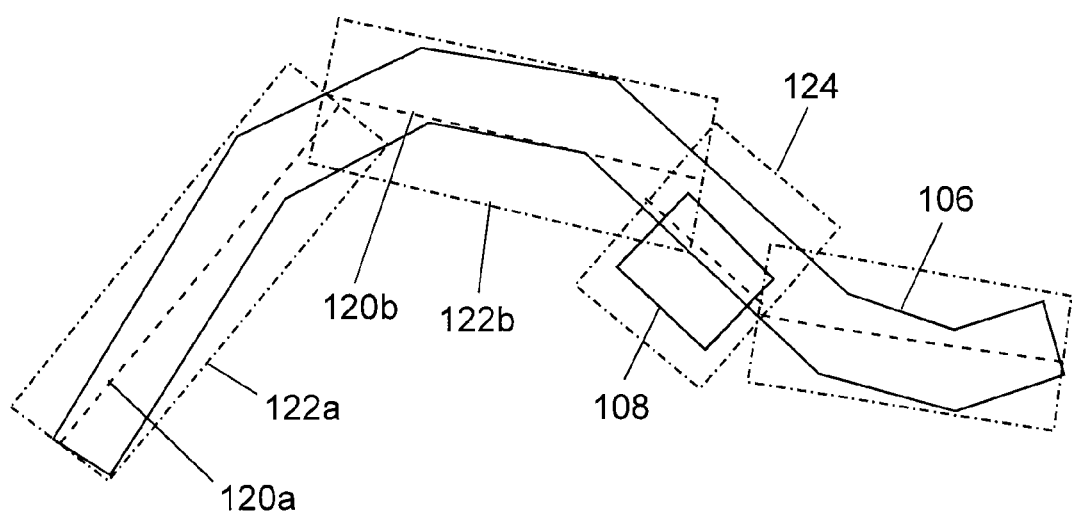
FIG. 8 shows the use of a wider survey path segment to cover the intersecting area of interest.

Increasing the number of flight lines is also of benefit when capturing a corridor survey path that is combined with an intersecting area of interest 108, e.g. town adjacent to a highway, as illustrated in FIG. 8 where a wider path segment 124 is used to capture the intersecting area of interest 108.

A flight plan is generated to plot a path for the aircraft to navigate so that all flight lines of all path segments are captured.

Figure 9:
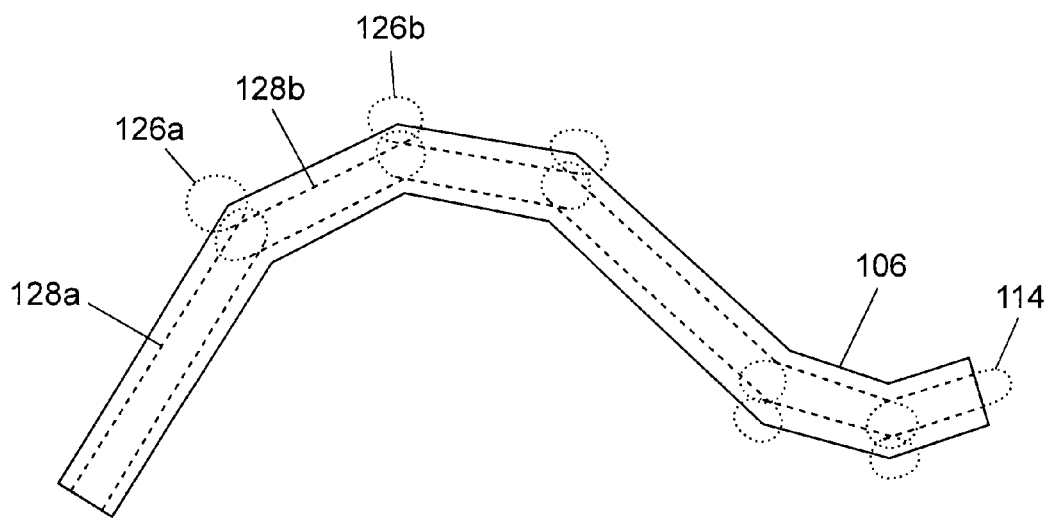
FIG. 9 shows the corridor area of interest covered using two sets of flight lines.

FIG. 9 shows two parallel sets of flight line segments 128 used to cover the corridor area 106. Here the path segments 120 (not shown) are derived directly from the straight-line segments of the corridor path polyline 102.

Firstly, the flight plan creation process creates an ordered list of flight line segments 128. Where the path segments 120 contain multiple flight lines, the flight line segments 128 within each path segment 120 may be flown sequentially to complete each segment 120. Alternately, the corridor length may be flown multiple times where the flight plan specifies one flight line segment 128 per path segment 120 in one direction along the corridor, followed by a return path flying a second flight line segment 128 in each path segment 120, and so on until the complete corridor width is captured.

Secondly, the path between consecutive flight line segments 128 is created. This specifies the path the pilot should follow to travel from the end of one flight line segment 128 to the start of the next flight line segment 128. The pilot may also be allowed to navigate between successive flight line segments 128 freely. As consecutive flight line segments 128 may intersect at an arbitrary angle, the required turn may be achieved with a small change in bearing, or may be achieved with a go-around 126 where the aircraft makes anything up to a 360-degree turn to align itself with the next flight line segment 128. Consecutive flight line segments 128 may intersect or may be separated by a distance.

Figure 10:
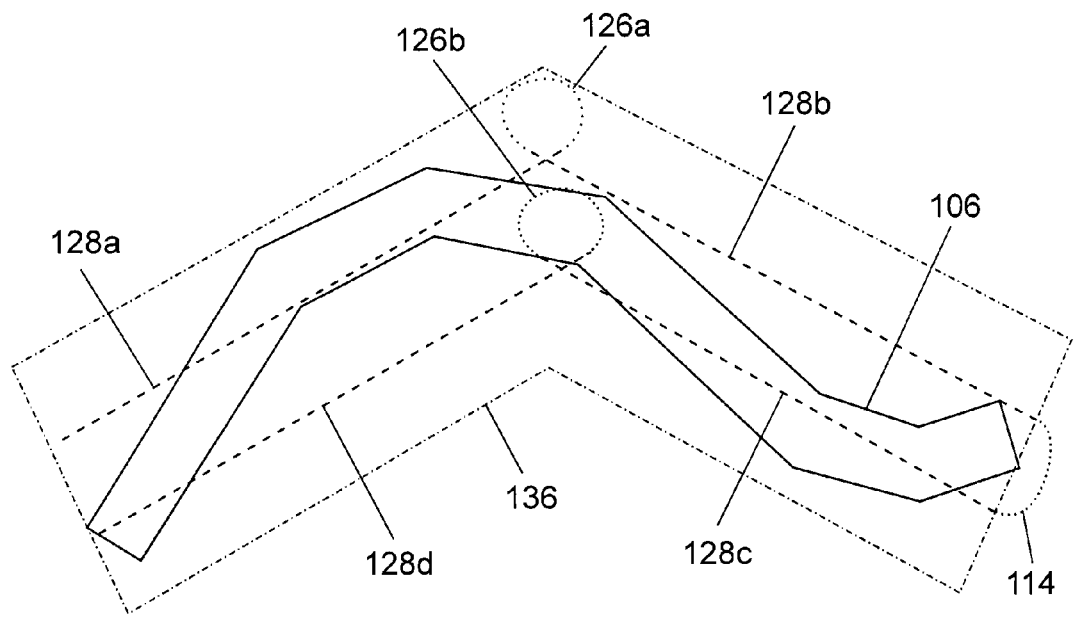
FIG. 10 shows the corridor area of interest covered using a smaller number of flight lines with a wider swath width.

The swath width 258 of an aerial camera system 350 increases with increasing field of view angle 250, and with increasing altitude 254. FIG. 10 shows two smaller parallel sets of flight line segments 128 used to cover the corridor area 106, assuming higher-altitude operation and/or wider-angle imaging than in FIG. 9, i.e. with a wider aggregate swath width 136.

To create a complete aerial orthomosaic for a survey area, every point within the survey boundary must be captured by the camera system. This is generally achieved through the use of overlap which allows for variation in the aircraft's yaw, pitch and roll between adjacent captured images.

Overlap is also used to improve the alignment of the orthomosaic with existing orthomosaics or survey ground features. The alignment is improved by imaging the same point on the ground from multiple angles, allowing the position and orientation of the camera system to be calculated with greater accuracy.

In general, increasing the overlap in a particular direction improves the orthomosaic alignment in the same direction. Increasing the forward overlap improves alignment in the direction of the flight path. Increasing the side overlap improves the alignment in the direction perpendicular to the flight path.

In the case of a corridor captured with a single flight line per path segment, overlap exists in the forward direction only. The absence of side overlap may cause misalignment of the orthomosaic with ground features. Misalignment error vectors are generally in a direction perpendicular to the corridor path in this case.

In general, a minimum of two or more parallel flight line segments 128 per survey path segment 120 should be captured to enable generation of orthomosaics with accurate alignment to ground features.

For corridor survey paths with a narrow width, capture of two parallel flight line segments 128 per path segment 120 may result in the capture of a significant area outside of the corridor survey boundary.

The following method optimises the process of capturing imagery of a narrow corridor survey path with accurate alignment. The method uses two flight lines with different planning characteristics, referred to as primary and secondary flight lines.

Primary flight lines are captured for the purpose of orthomosaic generation and require complete coverage of the corridor survey path.

Secondary flight lines are captured for the purpose of side overlap with the primary flight lines and are flown parallel to and offset laterally from the primary flight lines. Continuous side overlap is not required to achieve orthomosaic alignment. Alignment is achieved if each secondary flight line overlaps a majority of the length of its parallel primary flight line.

A flight plan for the primary and secondary flight lines is generated by firstly planning the corridor survey path with a single flight line configuration. The single primary flight line will generally follow the corridor path 100 (or corridor path polyline 102). Secondly, secondary flight line segments parallel to and offset laterally from the primary flight line segments are added to the flight plan.

As the secondary flight lines do not require complete coverage, the flight plan can allow for "free flying" the length of the corridor over the secondary flight line segments, where the aircraft turns directly from one flight line segment to the next. This enables the secondary flight lines to be captured without the go-arounds 126 that would be required to capture the complete length of every secondary flight line segment. The secondary flight line can also be flown along a curved flight path with banked turns as discussed further below.

Figure 11:
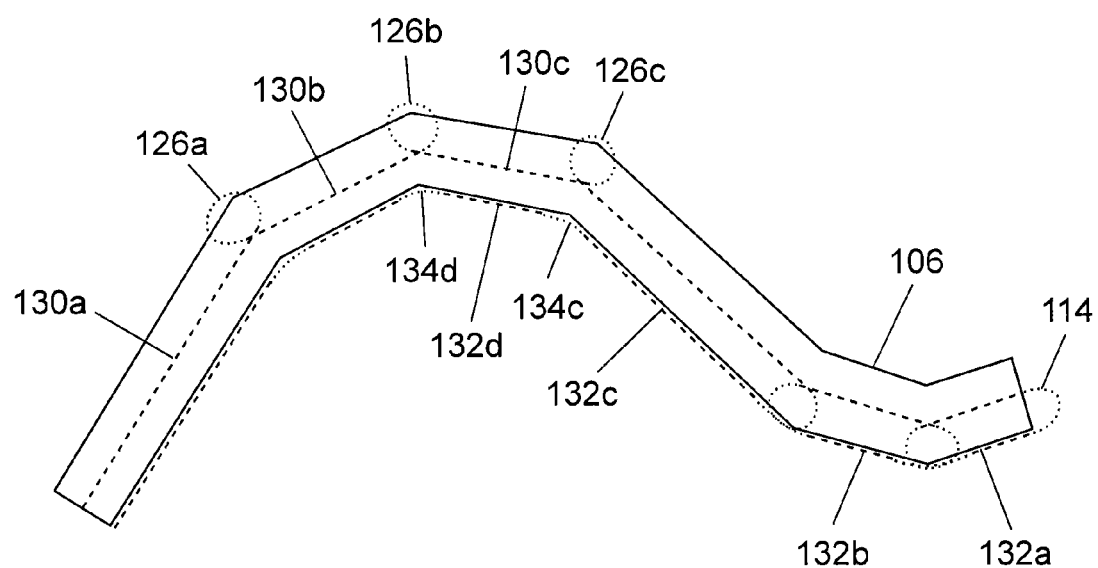
FIG. 11 shows the use of a primary flight line for capturing primary imagery of the corridor, and a secondary flight line for capturing secondary imagery of the corridor for accuracy purposes.

FIG. 11 shows a primary flight line, comprising a sequence of primary flight line segments 130, used to cover the corridor area 106, and a secondary flight line, comprising a sequence of secondary flight line segments 132, used to provide overlap for accuracy purposes. The primary flight line segments 130 are typically joined by go-arounds 126. The secondary flight line segments 132 are typically joined by turns 134 which may be flown freely.

When using a dual-resolution aerial camera system 352, as discussed in more detail below, the camera system may be configured to only capture overview imagery along the secondary flight line, as the overview imagery provides maximum overlap between flight lines The secondary flight line may be captured a significant time after the primary flight line, e.g. days or weeks later if convenient. This allows for the capture of long corridors while ferrying aircraft between locations.

When using a dual-resolution aerial camera system 352, the secondary flight line can be captured with both overview and detail cameras, allowing orthomosaics to be generated within the field of view of the secondary flight line. This creates a wider orthomosaic in areas of secondary flight line overlap but a narrower orthomosaic at corridor path segment intersections.

A further method for capturing corridors is available to aircraft that contain a camera system with a wide lateral field of view, e.g. achieved through multiple cameras capturing vertical imagery, left oblique imagery and/or right oblique imagery. Aerial camera systems that capture both vertical and oblique imagery are described in U.S. Pat. Nos. 8,497, 905 and 8,675,068 (Nixon), the contents of which are herein incorporated by cross-reference.

The flight plan plots a flight path along the flight lines using turns between consecutive flight line segments 128, without the use of go-arounds 126 to turn from one flight line to the next. The aircraft follows the flight path directly from one segment to the next, banking the aircraft to perform the turns. The flight line segments are planned such that the banking angle is less than the limit of the field of view of the oblique cameras.

Figure 12:
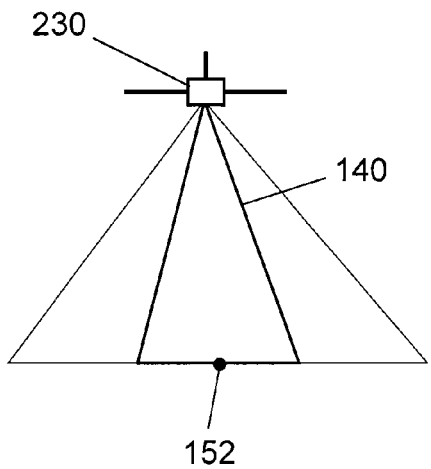
FIG. 12 shows the survey aircraft capturing vertical imagery of the corridor while flying level.
Figure 13:
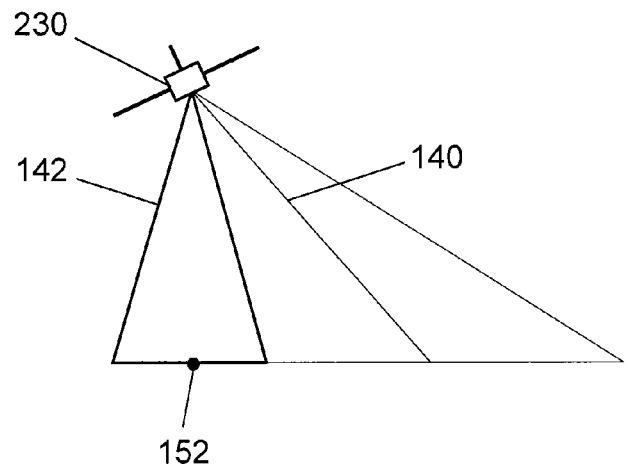
FIG. 13 shows the survey aircraft capturing vertical imagery of the corridor while flying banked.

The orthomosaic generation process uses the imagery closest to the nadir point. When flying horizontally, the vertical pointing camera is nadir, as shown in FIG. 12. When the aircraft is banking, the left or right oblique imagery is closest to nadir and is used for orthomosaic generation, as shown in FIG. 13.

A Digital Elevation Model (DEM) is a common by-product of the orthomosaic generation process. A DEM may be created by calculating the elevation of every point within the survey area. The elevation at a point may be calculated by locating the point in multiple images that contain the point. If the point is present in three or more images, its elevation may be triangulated using the interior and exterior orientation of the cameras.

The point elevations can be calculated with greater accuracy when each point is captured in a large number of images from different angles. This is achieved through the use of forward and side overlap.

In the case of corridor capture with primary and secondary flight lines, only part of the survey area may contain images captured with side overlap.

Figure 14:
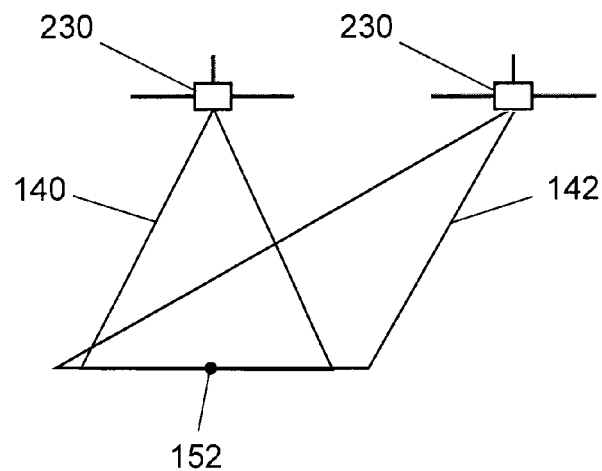
FIG. 14 shows the survey aircraft capturing both vertical and oblique imagery of the corridor.

A method to increase the imagery area containing side overlap is to capture oblique images from the secondary flight lines. The oblique images are captured by an imaging system directed at the centre of the primary flight line imagery, as shown in FIG. 14.

Additionally, the imagery captured from the secondary flight line may be used to generate an oblique orthomosaic of the corridor survey area.

Figure 15:
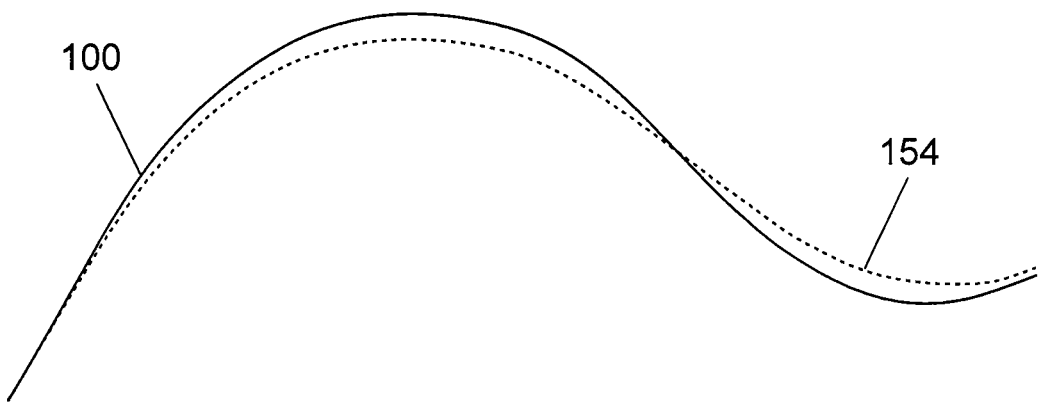
FIG. 15 shows a flight path with banked turns covering the corridor path.

A further method for capturing a corridor uses a curved flight path 154 based on the corridor path 100, as shown in FIG. 15.

Figure 16:
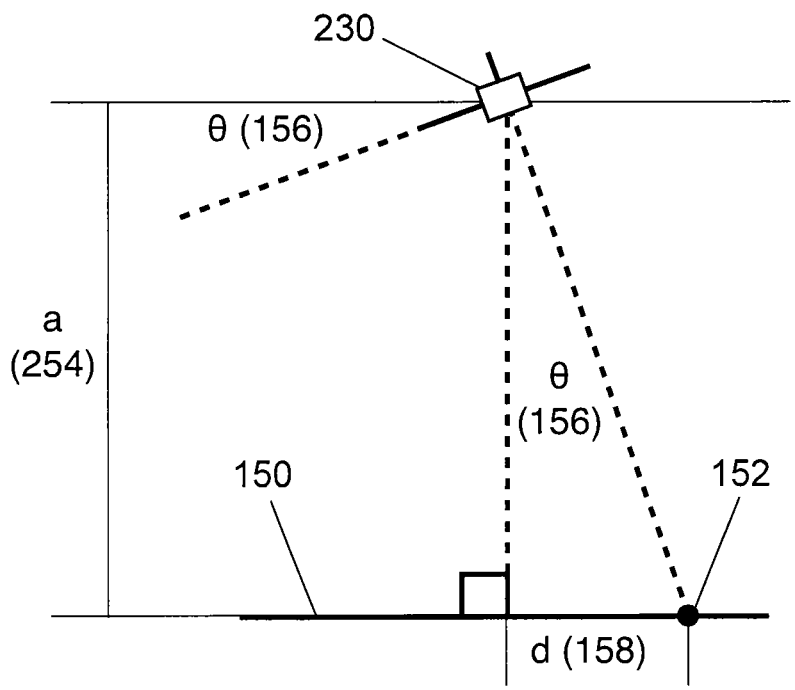
FIG. 16 shows a diagram and equations relating the vertical imaging offset of a banked aircraft to its altitude, bank angle, velocity and turn radius.

The curved flight path can be offset towards the center of curvature of the corridor path 100 at any given point, to account for the offset (d) 158 induced by the bank of the aircraft. As shown in the diagram and equations in FIG. 16, the offset (d) 158 is related to the altitude above ground level (a) 254, bank angle (theta) 156, aircraft velocity (v), bank radius (r), and gravity (g). Initially assuming the bank radius (r) is the radius of the corridor path 100 (at any given point), the final bank radius (r) and bank angle (theta) 156 can be arrived at iteratively.

Even when flying a curved flight path 154, if the corridor contains a sharp turn the pilot can perform a go-around 126 as usual.

Any suitable aerial camera system 350 may be utilised for corridor capture.

Sufficient redundancy for accurate bundle adjustment typically dictates the choice a longitudinal (forward) overlap of at least 60%, i.e. between successive photos along a flight line, and a lateral (side) overlap of at least 40%, i.e. between photos on adjacent flight lines. This is often referred to as 60/40 overlap.

The chosen overlap determines both the required flying time and the number of photos captured (and subsequently processed). High overlap is therefore expensive, both in terms of flying time and processing time, and practical choices of overlap represent a compromise between cost and orthomosaic accuracy.

The use of a dual-resolution or multi-resolution camera systems 352 provides a powerful way to reduce overlap without compromising accuracy. The capture and processing of multi-resolution aerial photos is described in U.S. Pat. Nos. 8,497,905 and 8,675,068 (Nixon), the contents of which are herein incorporated by cross-reference. Multi-resolution sets of photos allow orthomosaic accuracy to be derived from the overlap between lower-resolution overview photos, while orthomosaic detail is derived from higher-resolution detail photos.

U.S. Pat. Nos. 8,497,905 and 8,675,068 (Nixon), describe a family of external camera pods attachable to a small aircraft comprising multi-resolution vertical and oblique aerial imaging systems. U.S. patent application Ser. No. 14/310,523 (Tarlinton) and Ser. No. 14/478,380 (Lapstun), the contents of which are incorporated herein by reference, describe the HyperCamera™ family of multi-resolution aerial camera systems suitable for deployment in aircraft that have a standard camera hole.

Figure 17:
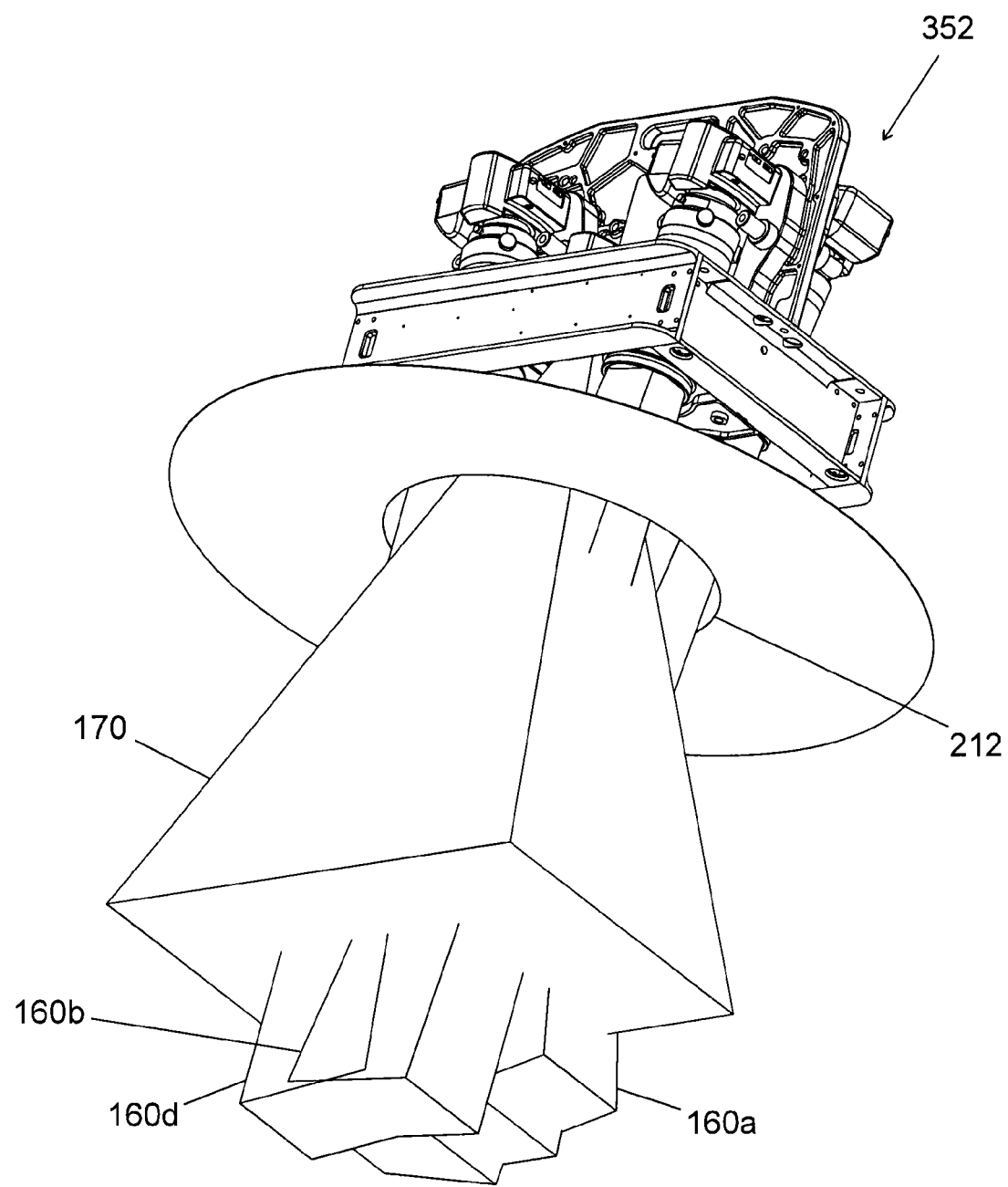
FIG. 17 shows a dual-resolution V5-300 HyperCamera aerial camera system.

FIG. 17 shows a dual-resolution V5-300 HyperCamera aerial camera system 352 which comprises one wide-angle overview camera and five narrow-angle detail camera, deployable in the cockpit or cabin of most survey aircraft that have a standard (e.g. 20-inch diameter) camera hole 212.

Figure 18:
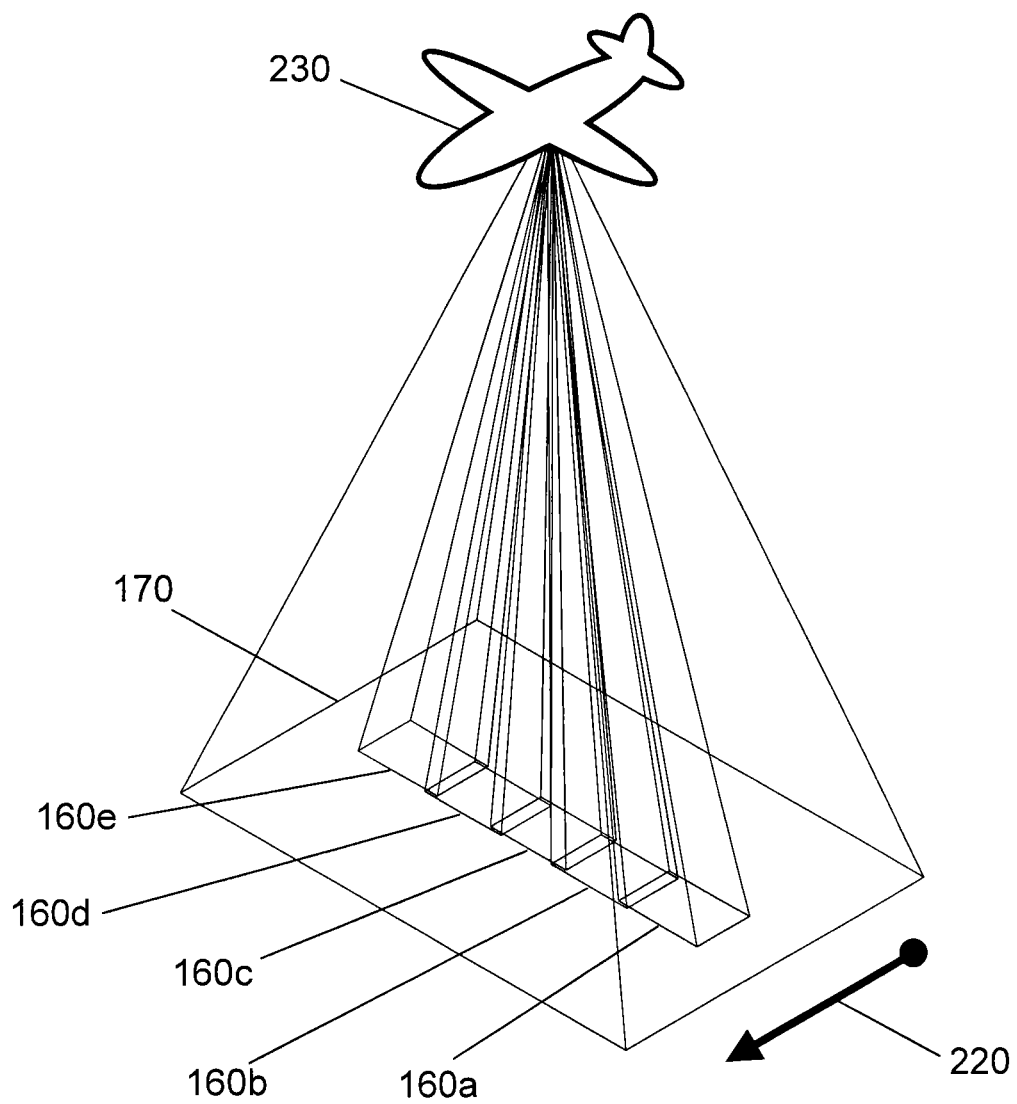
FIG. 18 shows the overview field of view and overlapping detail fields of view of a dual-resolution aerial camera system.

FIG. 18 shows the projection of the three-dimensional fields of view 160 and 170 of the detail cameras and overview camera of the HyperCamera unit onto a ground plane. It shows how the detail field of views 160 overlap in a direction perpendicular to the direction of flight 220.

Figure 19:
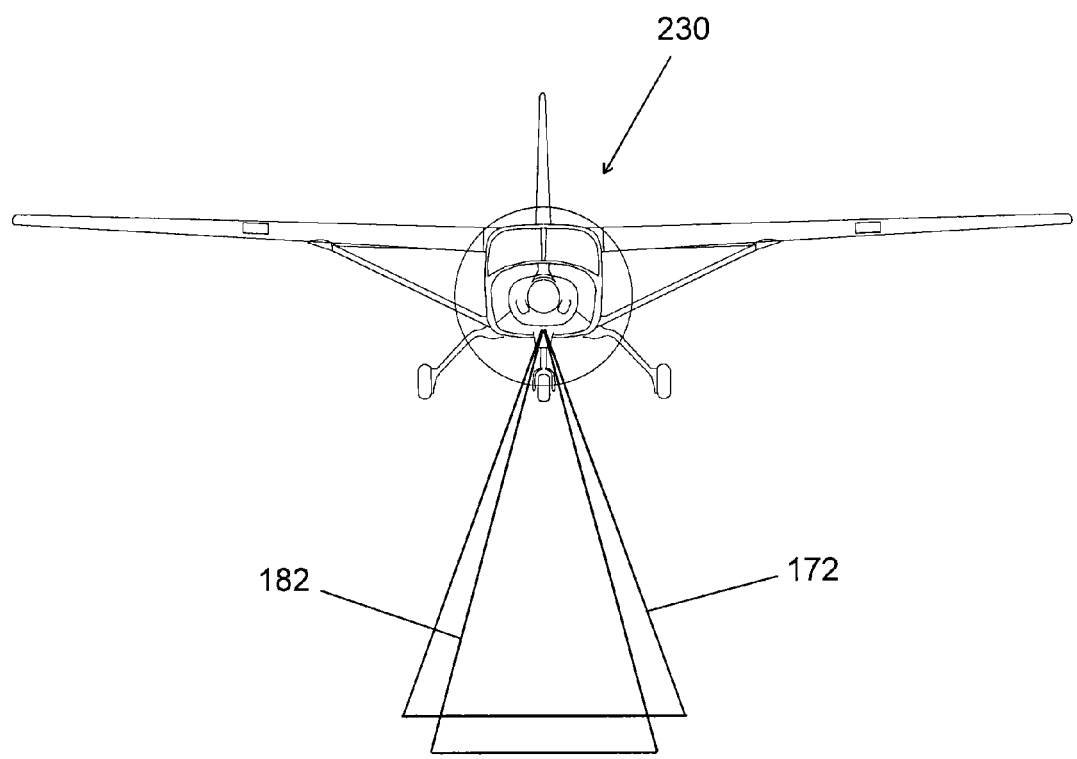
FIG. 19 shows a front elevation of a Cessna 208 aircraft carrying a dual-resolution aerial camera system, and the resultant overview and aggregate detail fields of view.

FIG. 19 shows a front elevation of the Cessna 208 survey aircraft 230 carrying a dual-resolution aerial camera system, and shows the lateral overview field of view 172 of the camera system 352, and the aggregate lateral detail field of view 182 of the camera system 352. The aggregate lateral detail field of view 182 is the aggregate of the five individual overlapping lateral detail fields of view 162.

Figure 20:
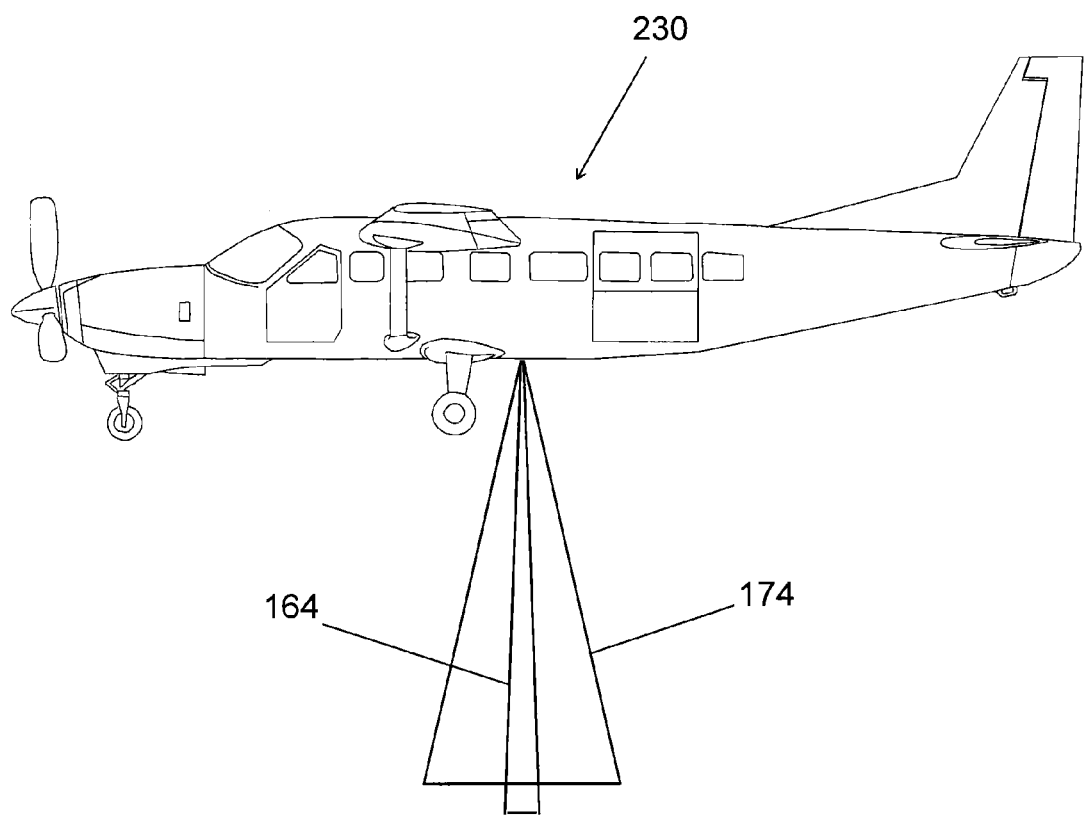
FIG. 20 shows a side elevation of a Cessna 208 aircraft carrying a dual-resolution aerial camera system, and the resultant overview and aggregate detail fields of view.

FIG. 20 shows a side elevation of the Cessna 208 survey aircraft 230 carrying a HyperCamera, and shows the longitudinal overview field of view 174 of the camera system 352, and the longitudinal detail field of view 164 of the camera system 352.

FIG. 17 shows the overlapping overview fields of view 170 and aggregate detail fields of view 180 of three successive shots in the direction of flight 220. The aggregate detail field of view 180 is the aggregate of the five individual overlapping detail fields of view 160. At the camera firing rate illustrated in the figure (i.e. as implied by the longitudinal overlap), the aggregate detail fields of view 180 overlap by about 20% longitudinally, while the overview fields of view 170 overlap by about 85% longitudinally.

FIG. 18 shows the overlapping overview fields of view 170 and aggregate detail fields of view 180 of two shots from adjacent flight lines, i.e. flown in opposite directions 220. At the flight-line spacing illustrated in the figure, the aggregate detail fields of view 180 overlap by between 20% and 25% laterally, while the overview fields of view 170 overlap by about 40% laterally.

Figure 21:
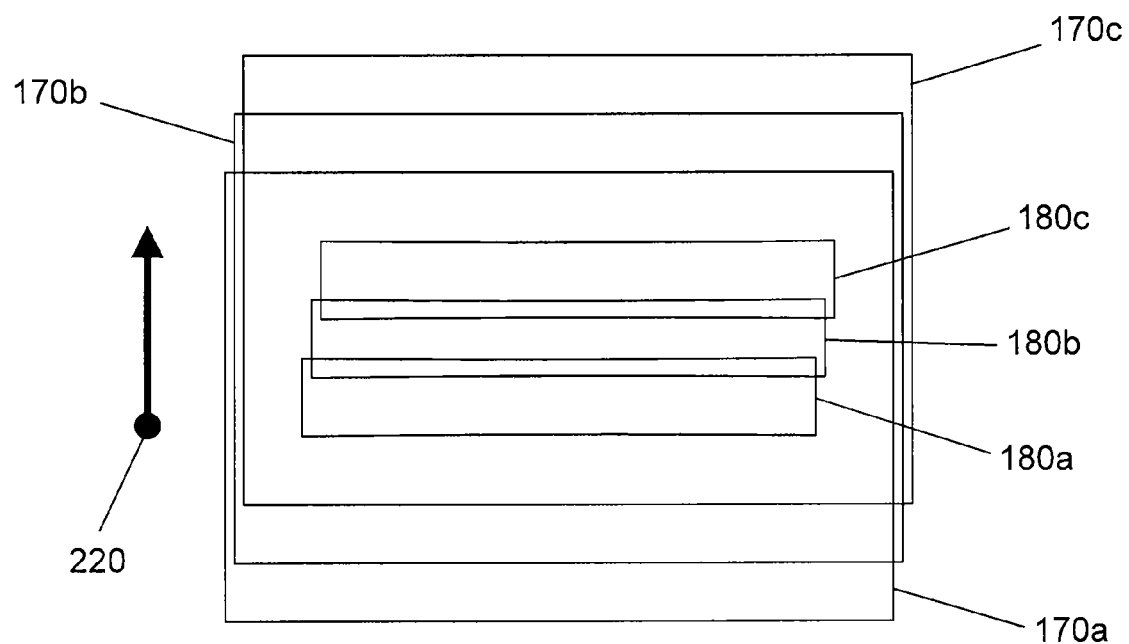
FIG. 21 shows the overlapping fields of view of three successive shots of a dual-resolution aerial camera system.
Figure 22:
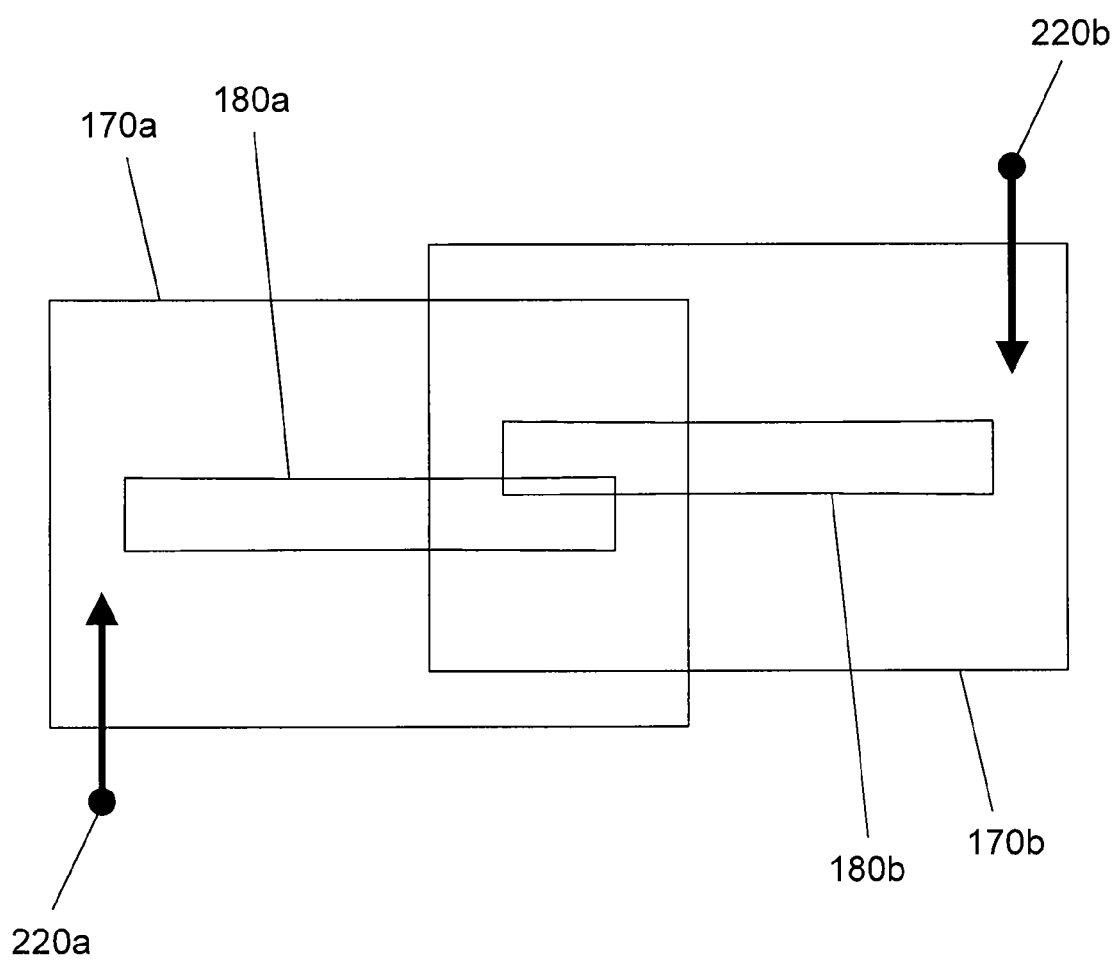
FIG. 22 shows the overlapping fields of view of shots of a dual-resolution aerial camera system in adjacent flight lines.

As already noted, traditional single-resolution aerial surveys are typically operated with 60/40 overlap, i.e. 60% forward (or longitudinal) overlap, and 40% side (or lateral) overlap. With the multi-resolution HyperCamera operated as shown in FIGS. 21 and 22, overview photos are captured with better than 85/40 overlap, and detail photos are typically captured with only 20/20 overlap or less.

FIG. 20 shows a block diagram of a power and control system for an aerial camera system 350, such as a dual-resolution HyperCamera system 352. The camera(s) 340 are controlled by a computer 300 via a set of analog-to-digital converters 308 (ADCs).

The computer 300 uses one or more Global Navigation Satellite System (GNSS) receiver 304 to monitor the position and speed of the survey aircraft 230 in real time. The GNSS receiver(s) may be compatible with a variety of space-based satellite navigation systems, including the Global Positioning System (GPS), GLONASS, Galileo and BeiDou.

The computer 300 provides precisely-timed firing signals to the camera(s) 340 via the ADC(s) 308, to trigger camera exposure, according to a stored flight plan and the real-time position and speed of the aircraft. If a camera(s) 340 incorporate an auto-focus mechanism then the computer 300 also provides a focus signal to each such camera to trigger auto-focus prior to exposure.

The computer 300 may fire the camera(s) 340 at the same rate. Alternatively, the computer 300 may fire the overview camera(s) of a dual-resolution system at a different rate to the detail cameras, i.e. either a higher rate or lower rate, to achieve a different overlap between successive overview photos, i.e. either a higher overlap or a lower overlap, independent of the overlap between successive detail photos. The computer 300 may fire the cameras simultaneously, or it may stagger the timing of the firing, e.g. to achieve a different alignment of photos longitudinally, or to reduce peak power consumption.

The flight plan describes each flight line making up the survey, and the nominal camera firing rate along each flight line required to ensure that the necessary overlap is maintained between successive shots. The firing rate is sensitive to the elevation of the terrain below the aircraft, i.e. the higher the terrain the higher the firing rate needs to be. It is adjusted by the computer 300 according to the actual ground speed of the aircraft, which may vary from its nominal speed due to wind and the pilot's operation of the aircraft.

The computer 300 also uses the flight plan and real-time GNSS position to guide the pilot along each flight line via a pilot display 302.

As shown in FIG. 20, the position data from the GNSS receiver is optionally augmented with orientation information from an inertial measurement unit 306 (IMU). This allows the computer 300 to provide enhanced feedback to the pilot on how closely the pilot is following the flight plan. In the absence of the IMU 306 the GNSS receiver connects directly to the computer 300.

The computer stores the GNSS position (and optionally IMU orientation, if the IMU 306 is present) of each shot. This is used during subsequent processing of the photos to produce an accurate orthomosaic.

One or more optional angular motion compensation (AMC) units 330, responsive to the orientation reported by the IMU 306, correct the orientation of the cameras so that they maintain a consistent pointing direction over time, despite the aircraft rolling, pitching or yawing during flight. This ensures that the captured photos can be used to create a photomosaic without gaps, while allowing the overlap between successive shots and between adjacent flight lines to be minimised.

The AMC 330 may consist of a platform with two or three axes of rotation (i.e. roll and pitch; or roll, pitch and yaw) upon which the camera(s) 340 are mounted. Commercially-available AMC platforms include the PAV series from Leica Geosystems.

Alternatively, the AMC 330 may comprise one or more beam-steering mechanisms in the optical path of each camera (or group of cameras), whereby the pointing direction of the cameras is corrected by beam-steering.

Angular motion compensation becomes increasingly important as the flying altitude is increased and/or the ground sampling distance (GSD) is decreased.

Motion blur due to the forward motion of the aircraft is equal to the speed of the aircraft multiplied by the exposure time of the camera. Once motion blur becomes a significant fraction of (or exceeds) the GSD it becomes useful to provide a forward motion compensation (FMC) mechanism to reduce or eliminate motion blur. FMC can be provided in a number of ways, including translating or rotating the optical axis of the camera (by moving the image sensor, or an intermediate mirror, or the camera itself), or by time delayed integration (TDI) of adjacent lines of pixels in the image sensor. FMC can be provided via an AMC unit.

Each camera 340 may store its shots locally, e.g. in removable flash memory. This eliminates the need for centralised storage in the camera system, and the need for a high-bandwidth data communication channel between the cameras and the centralised storage. Alternatively the camera system may incorporate centralised storage (not shown).

The GNSS position of each shot may be delivered to each camera 340, to allow the camera to tag each photo with its GNSS position.

Figure 23:
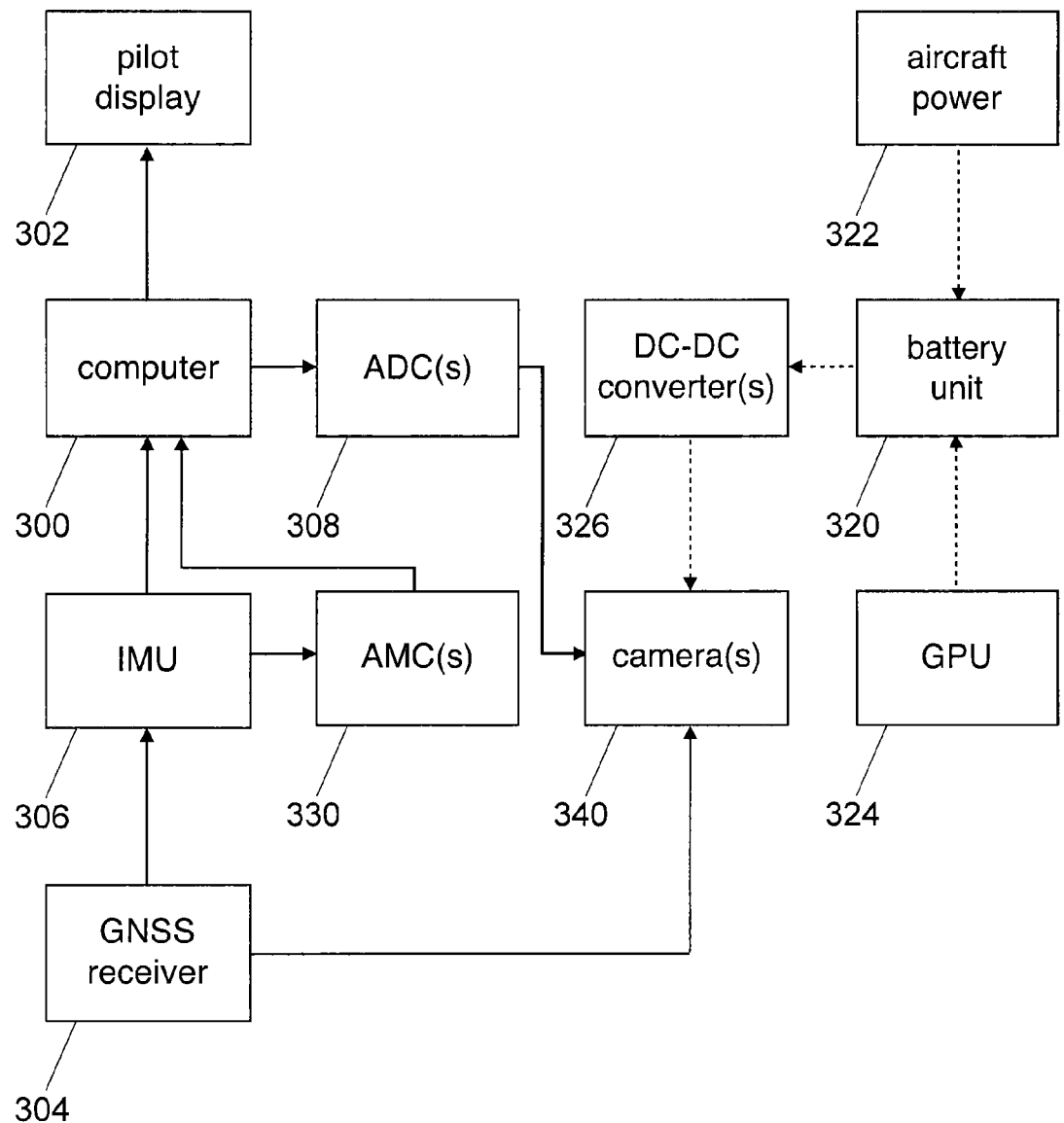
FIG. 23 shows a block diagram of a power and control system for an aerial camera system such as a HyperCamera.

The cameras 340 are powered by a battery unit 320. The battery unit 320 provides a voltage higher than the voltage required by all connected components, e.g. between 24V and 28V, and the voltage requirement of each connected component is provided via a DC-DC converter 326. For example, a Nikon D800 camera requires less than 10V. Additional DC-DC converters 326 also provide appropriate voltages to power the computer 300, the pilot display 302, the GNSS receiver 304, the IMU 306, and the AMC(s) 330. For clarity these power connections are omitted in FIG. 23.

The battery unit 320 contains two 12V or 14V batteries or a single 24V or 28V battery. It contains a charging circuit that allows it to be trickle-charged from an aircraft with a suitable auxiliary power source 322, allowing it to remain charged at all times. It may also be charged on the ground from a ground power unit 324 (GPU).

The ADCs 308 and DC-DC converters 326 may be housed in a camera control unit 310 (CCU). This may additionally include a USB interface to allow the computer 300 to control the ADCs.

The DC-DC converters 326 that provide power to the cameras 340 may be located in the CCU 310 or closer to the cameras in the distribution boxes 150.

Figure 24:
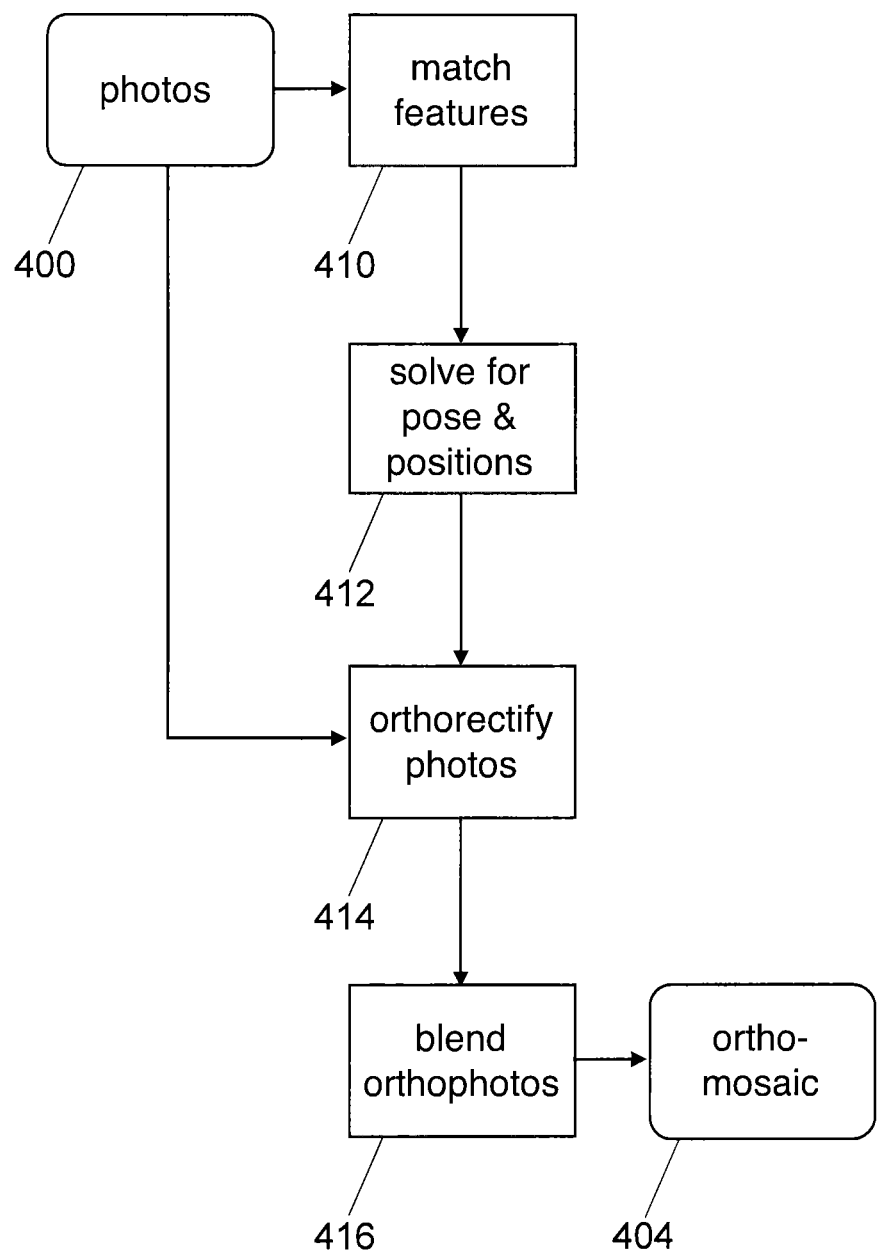
FIG. 24 shows a process flow for efficiently creating an orthomosaic from aerial photos.

Photos captured by the camera system 350 are intended to be seamlessly stitched into an orthomosaic, and FIG. 24 shows a process flow for efficiently creating an orthomosaic from detail photos 400 captured by one or more detail cameras 340.

Figure 25:
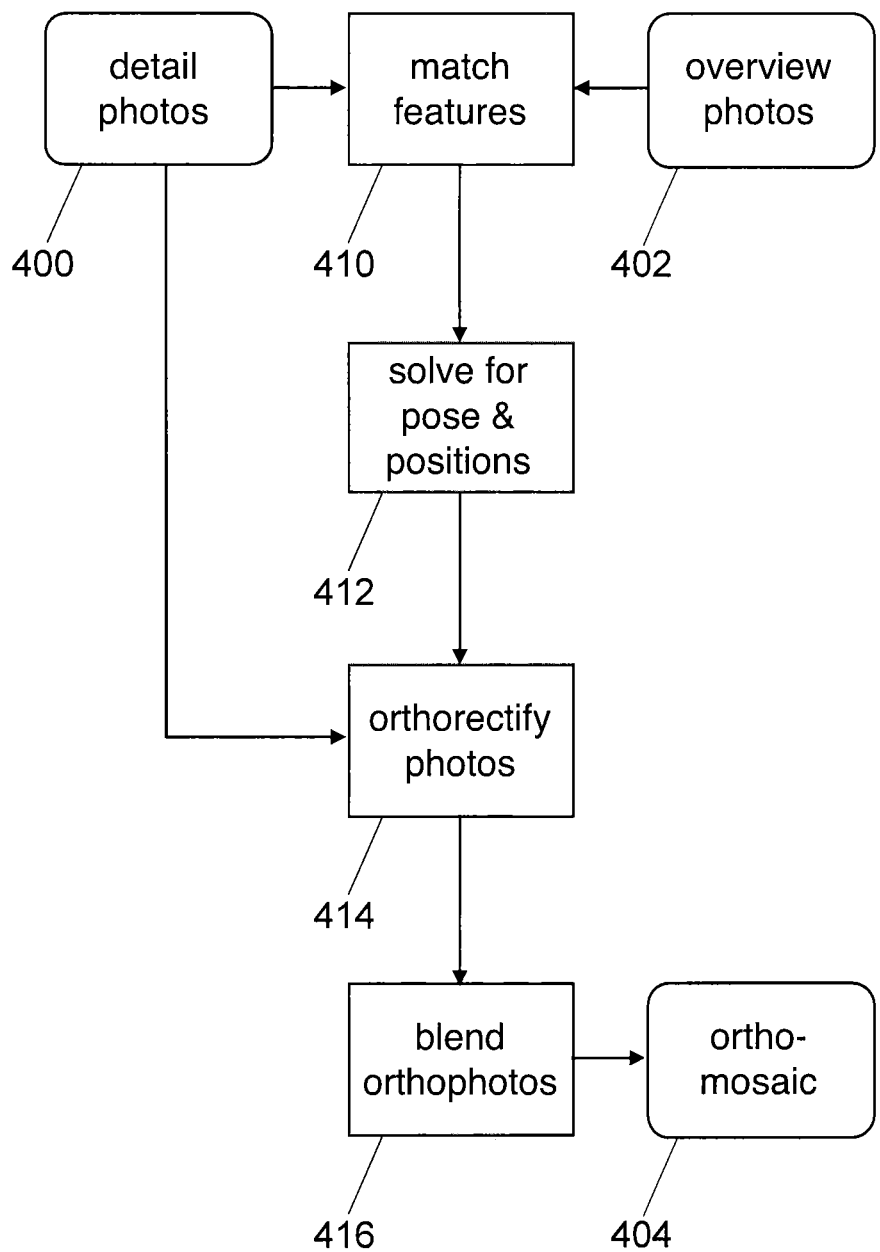
FIG. 25 shows a process flow for efficiently creating an orthomosaic from dual-resolution aerial photos.

If the camera system 350 is a dual-resolution (or multi-resolution) camera system 352 then the process flow, as shown in FIG. 25, also uses overview photos 402 from one or more overview cameras 340.

The process consists of four main steps: (1) features are automatically detected in each of the photos 400 (and optionally 402) and matched between photos (step 410); bundle adjustment is used to iteratively refine initial estimates of the real-world three-dimensional position of each feature, as well as the camera pose (three-dimensional position and orientation) and camera calibration (focal length and radial distortion etc.) associated with each photo (at step 412); each detail photo 400 is orthorectified according to its camera pose and terrain elevation data (at step 414); and the orthorectified photos (orthophotos) are blended to form the final orthomosaic 404 (at step 416).

In a single-resolution system the accuracy of the orthomosaic 404 derives from the conventional high overlap between detail photos 400, and the detail in the orthomosaic 404 also derives from the detail photos 400.

In a dual-resolution system the accuracy of the orthomosaic 404 derives from the high overlap between lower-resolution overview photos 402, while detail in the orthomosaic 404 derives from the higher-resolution detail photos 400.

The orthomosaic is typically stored as an image pyramid, i.e. within which different (binary) zoom levels are pre-computed for fast access at any zoom level. Lower zoom levels in the pyramid are generated from higher zoom levels by low-pass filtering and subsampling, thus the entire pyramid may be generated from the detail-resolution orthomosaic. As an alternative, lower zoom levels may be generated from an orthomosaic created from the overview photos 402, in which case the overview photos 402 are also orthorectified and blended as described above for the detail photos 400.

An initial estimate of the camera pose of each photo, subsequently refined by the bundle adjustment process (at step 412), is derived from the GNSS position of each photo, as well as its IMU-derived orientation, if available.

The terrain data used to orthorectify (at step 414) the detail photos 400 may be based on 3D feature positions obtained from bundle adjustment (at step 412), or may be terrain data sourced from elsewhere (such as from a LiDAR aerial survey).

Automatically detected ground features may be augmented with manually-identified ground points, each of which may have an accurate surveyed real-world position (and is then referred to as a ground control point).

The present invention has been described with reference to a number of preferred embodiments. It will be appreciated by someone of ordinary skill in the art that a number of alternative embodiments of the present invention exist, and that the scope of the invention is only limited by the attached claims.

The invention claimed is:

1. A method of creating an orthomosaic of a corridor area which has a greater length than width, the corridor area at least partially described by a corridor path which is not straight, the method comprising:
    (a) flying an aircraft substantially level along a primary flight line, the primary flight line comprising a sequence of straight primary flight line segments, each primary flight line segment approximating part of the corridor path;
    (b) capturing, during flight along each primary flight line segment and via an aerial camera system carried by the aircraft, a sequence of primary images, each primary image at least partially overlapping its successor in the sequence;
    (c) flying the aircraft along a secondary flight line, the secondary flight line comprising a sequence of secondary flight line segments, each secondary flight line segment substantially parallel to part of the corridor path;
    (d) capturing, during flight along each secondary flight line segment and via the aerial camera system carried by the aircraft, a sequence of secondary images, at least some of the secondary images overlapping at least some of the primary images;
    (e) identifying, in a plurality of the primary images and secondary images, common features corresponding to common ground points;
    (f) estimating, via bundle adjustment and from the common ground points, an exterior orientation associated with each primary image and a three-dimensional position associated with each ground point;
    (g) orthorectifying, using at least some of the exterior orientations and at least some of the three-dimensional ground point positions, at least some of the primary images; and
    (h) merging the orthorectified primary images to create the orthomosaic.

2. The method of claim 1, wherein the aircraft is flown along a go-around turn between each primary flight line segment and its successor, the turn having an angle greater than 180 degrees.

3. The method of claim 1, wherein the aircraft is flown along a turn between each secondary flight line segment and its successor, the turn having an angle less than 90 degrees.

4. The method of claim 1, wherein the aerial camera system comprises at least one vertical camera for capturing substantially vertical images.

5. The method of claim 4, wherein the aerial camera system comprises at least one oblique camera for capturing substantially oblique images.

6. The method of claim 5, wherein the primary images and secondary images comprise both vertical images and oblique images.

7. The method of claim 5, wherein the primary images comprise vertical images and the secondary images comprise oblique images.

8. The method of claim 1, wherein the aerial camera system comprises at least one overview camera for capturing overview images, and a plurality of detail cameras for capturing detail images, each detail image having a higher resolution than the at least one overview image, at least some of the detail images overlapping some of the overview images, the primary images comprising both overview images and detail images.

9. The method of claim 8, wherein the secondary images comprise both overview images and detail images.

10. The method of claim 1, wherein the secondary flight line is curved, at least in parts, and includes banked turns.

* * * * *